United States Patent
Krishnan

(10) Patent No.: US 7,043,261 B2
(45) Date of Patent: May 9, 2006

(54) SYSTEM, MOBILE STATION AND METHOD FOR DELIVERING SERVICES

(75) Inventor: Arjun Krishnan, Plano, TX (US)

(73) Assignee: Nokia Corporation, Espoo (FI)

( * ) Notice: Subject to any disclaimer, the term of this patent is extended or adjusted under 35 U.S.C. 154(b) by 118 days.

(21) Appl. No.: 10/609,180

(22) Filed: Jun. 27, 2003

(65) Prior Publication Data

US 2004/0266401 A1   Dec. 30, 2004

(51) Int. Cl.
*H04Q 7/20* (2006.01)
(52) U.S. Cl. ............... 455/458; 455/550.1; 455/560; 455/428; 455/450
(58) Field of Classification Search ............ 455/422.1, 455/428, 445, 509, 517, 458, 417, 450, 550.1, 455/552.1, 560; 370/341
See application file for complete search history.

(56) References Cited

U.S. PATENT DOCUMENTS

| | | | |
|---|---|---|---|
| 4,399,555 A | | 8/1983 | MacDonald et al. |
| 5,533,102 A | * | 7/1996 | Robinson et al. ........ 379/88.25 |
| 5,559,860 A | | 9/1996 | Mizikovsky |
| 5,570,413 A | * | 10/1996 | Ahlberg et al. .......... 455/550.1 |
| 5,781,612 A | | 7/1998 | Choi et al. |
| 5,794,156 A | * | 8/1998 | Alanara ...................... 455/517 |
| 5,832,060 A | * | 11/1998 | Corlett et al. ............ 379/88.19 |
| 6,253,075 B1 | * | 6/2001 | Beghtol et al. ............. 455/415 |
| 6,728,548 B1 | * | 4/2004 | Willhoff ..................... 455/466 |
| 2002/0009134 A1 | * | 1/2002 | Fischel et al. ........... 455/226.1 |
| 2003/0232629 A1 | * | 12/2003 | Jang et al. ............... 455/552.1 |
| 2003/0235186 A1 | * | 12/2003 | Park .......................... 370/352 |
| 2004/0203469 A1 | * | 10/2004 | Patel et al. .............. 455/67.14 |

* cited by examiner

*Primary Examiner*—Joseph Feild
*Assistant Examiner*—Kamran Afshar
(74) *Attorney, Agent, or Firm*—Alston & Bird LLP

(57) ABSTRACT

A system, mobile station and method are provided for delivering services such as voice messages, voice clips, video clips and/or multimedia clips. The system includes a network entity, such as a calling entity, a Base Station/MSC/Interworking function (BMI) or any portions thereof. In addition, the system includes a mobile station. The network entity is capable of initiating a call to the mobile station by transmitting an alert message over a traffic channel. The mobile station can receive the alert message, and thereafter transmit a connect message over the traffic channel in response to the alert message. Advantageously, the mobile station is capable of transmitting the connect message without the call initiated by the network entity first being answered. The network entity can then establish a communication link with the mobile station over the traffic channel such that the service can be delivered to the mobile station over the communication link.

26 Claims, 3 Drawing Sheets

SYSTEM, MOBILE STATION AND METHOD FOR DELIVERING SERVICES

FIELD

The present invention generally relates to systems, mobile stations and methods for receiving voice message services and, more particularly, relates to systems, mobile stations and methods for receiving voice message services independent of user intervention.

BACKGROUND

Wireless telecommunications systems provide a convenient way for users to communicate. Typically, wireless telecommunications systems are made up of a series of mobile switching centers connected to base stations and landline telecommunications networks. The mobile switching centers are typically capable of controlling the operation of the base stations. In this regard, the base stations typically have the capacity to communicate with each other via base station controllers and to establish a fixed number of radio frequency (RF) traffic channels with remote mobile stations. The RF communications channels act as a conduit by which the mobile stations may ultimately communicate, such as with each other and/or landline phones, for example. Thus, as long as a mobile user remains within the geographic coverage area of the wireless system, communication with other mobile and landline users is possible.

To standardize the operation of wireless systems, several communication implementations have been developed. One such implementation, currently used in numerous wireless communication system deployments, is known as Time Division Multiple Access (TDMA). This communication technique is described under the TIA/EIA/IS-136 standard (IS-136). Accordingly, the IS-136 standard is incorporated by reference in its entirety so as to provide the reader with adequate background information regarding mobile station operation in an IS-136 telecommunications environment.

Current wireless systems allow landline users to place and receive calls with mobile station users. Additionally, mobile station users can place and receive calls with other mobile station users. Fixed mobile switching centers and base stations facilitate these calls by routing the calls between users and handling necessary overhead activities required to establish the RF traffic channels used to conduct the calls.

Typically, when a landline user or other mobile station user calls a mobile station user, the mobile switching center acts as an intermediary by alerting the mobile station of the attempted call via at least one RF traffic channel. After alerting the mobile station, the mobile switching center waits for a fixed time period, which defines a ringing cycle, to receive a response from the mobile station. A response indicates the mobile station is ready to accept the call. However, if the mobile station does not respond within the ringing cycle time period, the mobile switching center releases the call by terminating a call alert to the mobile station and signaling to the caller that the mobile station is unavailable, or alternatively redirecting the call to a message center to record a message for the mobile station user. During the ringing cycle, the mobile station produces an audible ringing or mechanical vibration to alert the mobile station user of the incoming call. If the mobile station user decides to answer the incoming call, a response is sent from the mobile station to the mobile switching center indicating that the call is to be accepted. The mobile switching center then sets up a connection on the existing RF traffic channel or establishes a second RF traffic channel where the call will ultimately be connected.

One of the major benefits to users of mobile phones is the ability to place or receive calls without being restricted to a fixed location as when using a landline phone. So long as the mobile phone maintains an RF communication channel with at least one base station, communication services are generally available. This allows mobile users to send and receive calls when away from their home or office and even while traveling in automobiles. However, having accessibility to instant communications may at times have undesirable consequences. In particular, unless the mobile phone is powered off, there may be no action a user may take to prevent the phone from proceeding through the entire ringing cycle, even in instances in which the user of the mobile phone desires to receive only non-real time, voice messages. This means that for every unanswered incoming call, the phone will ring for the entire ringing cycle until the call is released by the base station, sent to a voice message application on the mobile phone, or forwarded to a message center, each of which may be capable of receiving a voice message. Even if the user is able to mute the audible ringing, the call is still processed by the phone until released, sent to a voice message application, or forwarded to a message center. By requiring the mobile phone to process each call, the phone may occupy a traffic channel for an undesirable period of time, thus reducing system capacity during those periods in which calls are processed but ultimately not answered.

SUMMARY

In light of the foregoing background, the present invention provides an improved system, mobile station and method for delivering services, such as to the mobile station. According to embodiments of the present invention, the mobile station is capable of being configured to reduce the period of time the mobile station occupies a traffic channel in instances in which a user of the mobile station desires to receive services, such as voice clips, messages or the like. Additionally, or alternatively, according to embodiments of the present invention, the mobile station can receive services without requiring as many traffic channels as compared to conventional techniques. More particularly, the mobile station is capable of being configured to receive services without a user of the mobile station being notified of a call to the mobile station, and without such a call being answered.

According to one aspect of the present invention, a system is provided for delivering a service, such as a voice message, a voice clip, a video clip and/or a multimedia clip, to a mobile station. The system includes a network entity, such as a calling entity (e.g., a message center, a calling party, etc.), a Base Station/MSC/Interworking function (BMI) or any portions thereof. In addition, the system includes a mobile station. The network entity is capable of initiating a call to the mobile station by transmitting an alert message over a traffic channel. The mobile station can receive the alert message, and thereafter enter a conversation or information transfer state based upon the alert message without the initiated call first being answered. In this regard, the mobile station can enter the conversation or information transfer state such that the mobile station can receive a service. The mobile station can be capable of alerting a user of the call after the receiver receives the alert message such that the user can answer the incoming call. In such instances, the mobile station can be capable of entering the conversation or information transfer state if the user does not answer the incoming call.

The mobile station can enter the conversation or information transfer state in any of a number of different manners. For example, the mobile station can enter the conversation or information transfer state by transmitting a connect message over the traffic channel to the network entity in response to the alert message. Advantageously, the mobile station is capable of transmitting the connect message without the call initiated by the network entity first being answered. Further, the mobile station may be capable of transmitting the connect message without first waiting for an answer to the call. In order to provide for this type of service delivery, and before the mobile station receives the alert message, the mobile station can be capable of being configured to receive the service without the call initiated by the network entity first being answered by the mobile station.

After the mobile station has transmitted the connect message, the network entity can then establish a communication link with the mobile station over the traffic channel such that the service can be delivered to the mobile station over the communication link. In a more particular embodiment, the service comprises a voice message. In such an embodiment, the mobile station can be further capable of activating a voice message application to thereby receive the voice message delivered to the mobile station over the communication link.

A mobile station and method of delivering a service are also provided. Embodiments of the present invention therefore provide an improved system, mobile station and method for delivering services, such as to the mobile station. In this regard, the mobile station is capable of being configured to reduce the period of time the mobile station occupies a traffic channel, and/or to require less traffic channels to deliver services, as compared to conventional techniques. Therefore, the system and method of embodiments of the present invention solve the problems identified by prior techniques and provide additional advantages.

BRIEF DESCRIPTION OF THE DRAWINGS

Figure 1:
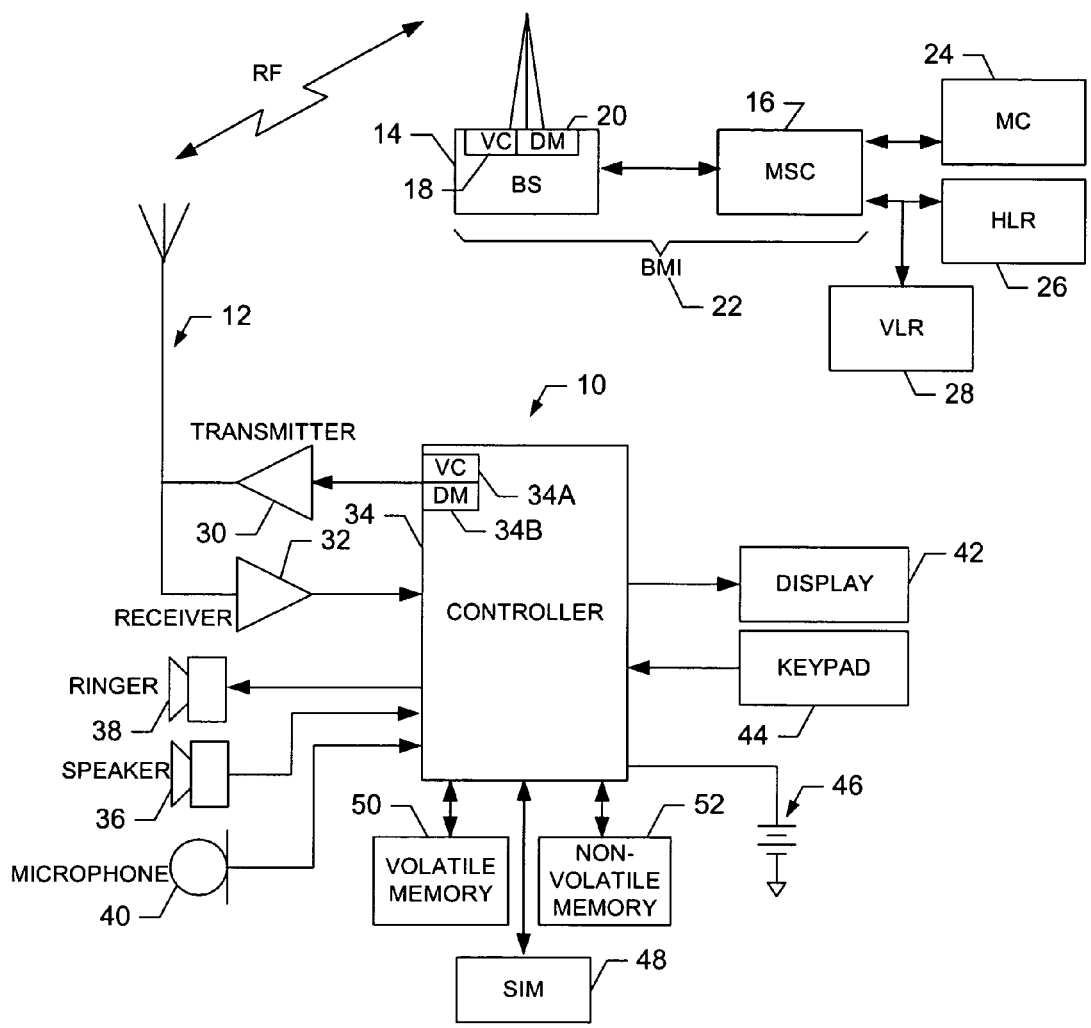
Figure 2:
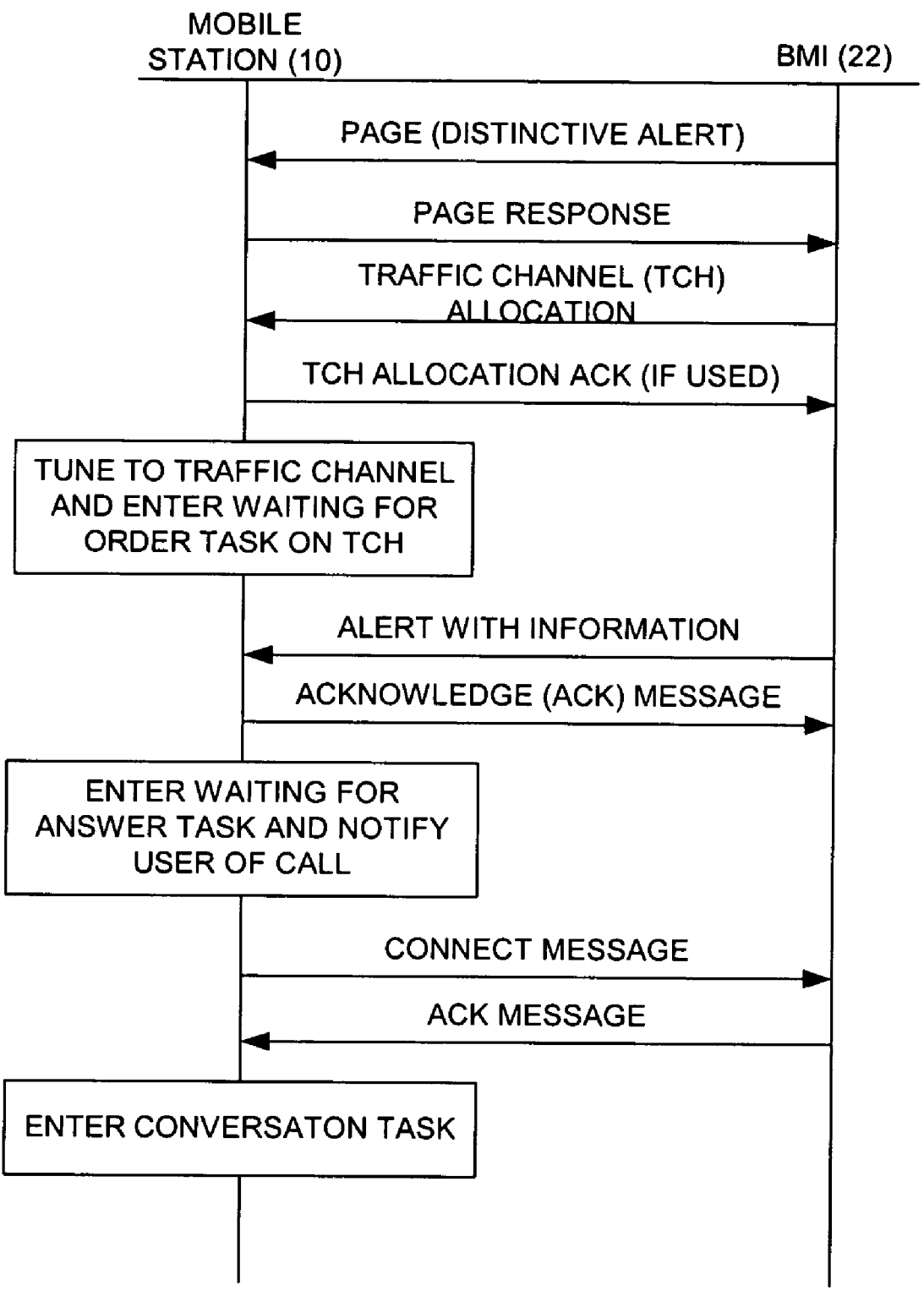
Figure 3:
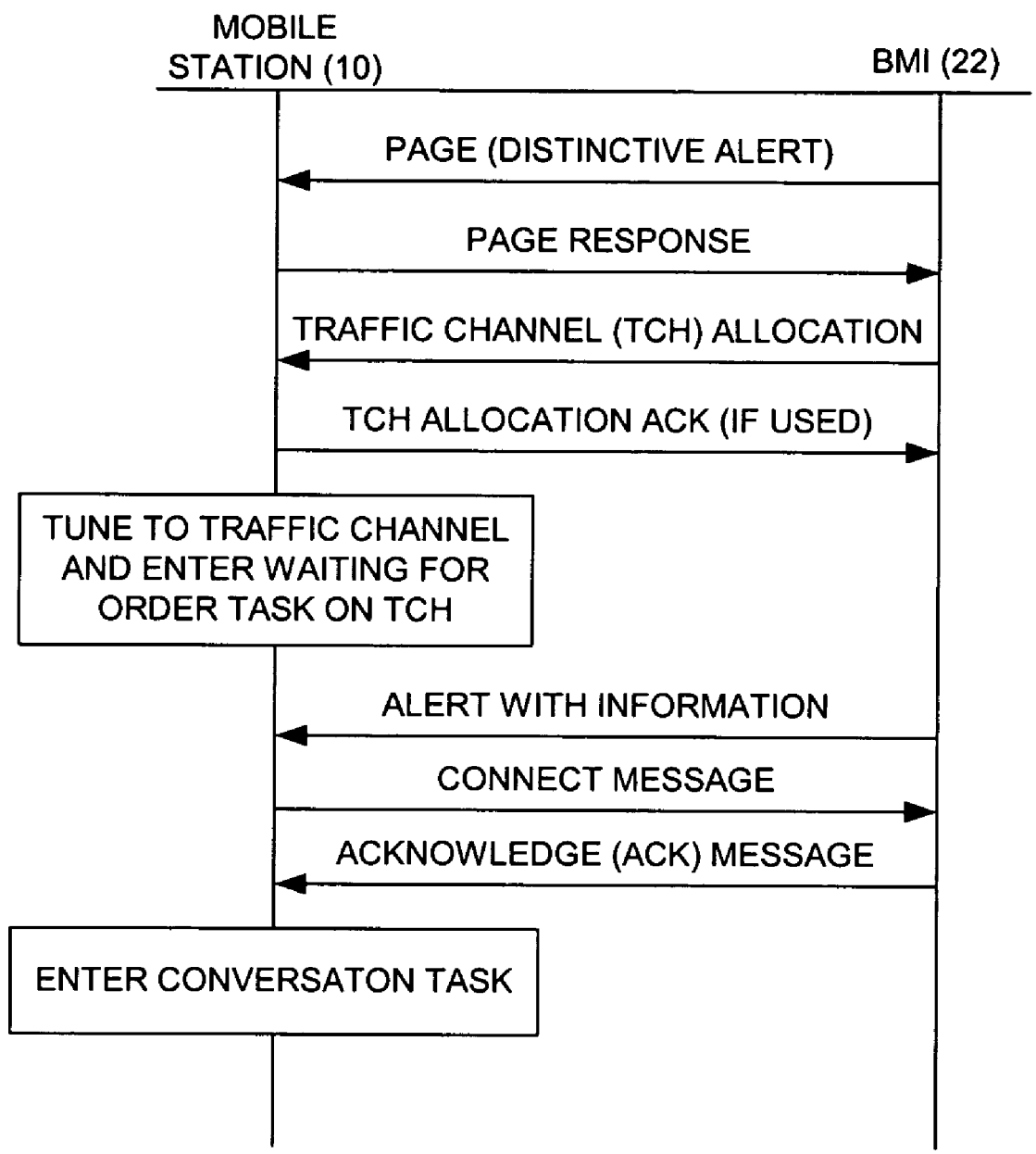

Having thus described the invention in general terms, reference will now be made to the accompanying drawings, which are not necessarily drawn to scale, and wherein:

FIG. 1 is a block diagram of a wireless communications system to which a mobile station is bidirectionally coupled through wireless RF links, according to one embodiment of the present invention;

FIG. 2 is a signaling flow diagram illustrating the steps in a method of setting up a call between a Base Station/MSC/Interworking function (BMI) and the mobile station; and FIG. 3 is a signaling flow diagram illustrating the steps in a method of setting up a call between a Base Station/MSC/Interworking function (BMI) and the mobile station to thereby deliver services to the mobile station, according to one embodiment of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The following will describe a system and method of delivering services to a receiving entity. The receiving entity can comprise any of a number of different entities capable of receiving a call. For example, the receiving entity can comprise any of a number of different wireline or wireless terminals. Reference is now made to FIG. 1, which illustrates one type of wireless communications network including a receiving entity comprising terminal that would benefit from the present invention, where the terminal comprises a mobile station 10. It should be understood, however, that the mobile terminal illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention. In addition, while several embodiments of the system and method of the present invention include a terminal comprising a mobile station, the terminal need not comprise a mobile station, and the receiving entity need not comprise a terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

As shown, the mobile station 10 includes an antenna 12 for transmitting signals to and for receiving signals from a base site or base station (BS) 14. The base station is a part of a cellular network that includes a mobile switching center (MSC) 16, voice coder/decoders (vocoders) (VC) 18, data modems (DM) 20, and other units required to operate the network. The MSC is capable of routing calls and messages to and from the mobile station when the mobile station is making and receiving calls. As indicated above, the cellular network may also be referred to as a Base Station/MSC/Interworking function (BMI) 22. The MSC controls the forwarding of messages to and from the mobile station when the station is registered with the network, and also controls the forwarding of messages for the mobile station to and from a message center (MC) 24. Such messages may include, for example, voice messages received by the MSC from users of Public Switched Telephone Network (PSTN) telephones, and may also include Short Message Service (SMS) messages and voice messages received by the MSC from the mobile station or other mobile terminals serviced by the network.

Subscriber data of a mobile station 10 is stored permanently in a Home Location Register (HLR) 26 of the system and temporarily in the Visitor Location Register (VLR) 28 in the area of which the mobile station is located at a given moment. In this regard, the VLR contains selected administrative information necessary for call control and provision of the subscribed services for each mobile station currently located in the geographical area controlled by the VLR. Although each functional entity can be implemented as an independent unit, manufacturers of switching equipment generally implement the VLR together with the MSC 16 so that the geographical area controlled by the MSC corresponds to that controlled by the VLR, thus simplifying the signaling required. As such, the MSC and VLR may be collectively be referred to as the MSC/VLR.

The mobile station 10 includes a transmitter 30, a receiver 32, and a controller 34 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/analog phones). As described herein, the mobile station and BMI 22 communicate according to the IS-136 protocol, but it should be understood that the mobile station and BMI can communicate according to any of a number of other protocols without departing from the spirit and scope of the present invention.

It is also understood that the controller 34 includes the circuitry required for implementing the audio and logic functions of the mobile station 10. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 34A, and may include an internal data modem (DM) 34B. Further, the controller 34 may include the functionally to operate one or more software programs, which may be stored in memory.

The mobile station 10 also comprises a user interface including a conventional earphone or speaker 36, a ringer 38, a microphone 40, a display 42, and a user input interface, all of which are coupled to the controller 34. The user input interface, which allows the mobile station to receive data, can comprise any of a number of devices allowing the mobile station to receive data, such as a keypad 44, a touch display (not shown) or other input device. In embodiments including a keypad, the keypad includes the conventional numeric (0–9) and related keys (#, *), and other keys used for operating the mobile station.

The mobile station further includes a battery 46, such as a vibrating battery pack, for powering the various circuits that are required to operate the mobile station, as well as optionally providing mechanical vibration as a detectable output, as described below. The mobile station 10 can also include memory, such as a subscriber identity module (SIM) 48, a removable user identity module (R-UIM) or the like, which typically stores information elements related to a mobile subscriber. In addition to the SIM, the mobile station can include other memory. In this regard, the mobile station can include volatile memory 50, such as volatile Random Access Memory (RAM) including a cache area for the temporary storage of data. The mobile station can also include other non-volatile memory 52, which can be embedded and/or may be removable. The non-volatile memory can additionally or alternatively comprise an EEPROM, flash memory or the like. The memories can store any of a number of pieces of information, and data, used by the mobile station to implement the functions of the mobile station. For example, the memories can include an identifier, such as an international mobile equipment identification (IMEI) code, capable of uniquely identifying the mobile station, such as to the MSC 16.

Referring to FIG. 2, the flow of signals is shown for a known technique of setting up a call with the mobile station 10. According to the method, a calling party (e.g., mobile station, fixed terminal, etc.) notifies the local BMI 22 of the mobile station, either directly or indirectly, of an intent to deliver services to the mobile station. To establish communication between the calling party and the mobile station, then, a page message is sent from the BMI 22 to the mobile station on a control channel (with a distinctive alert message). The mobile station can then reply with a page response back to the BMI. Next, the BMI sends the mobile station a traffic channel (TCH) allocation, to which the mobile station may optionally respond with a TCH allocation acknowledgement (ACK) message. Thereafter, the mobile station re-tunes to the allocated traffic channel and starts TCH transmission by entering a "Waiting for Order" task.

The BMI then sends the mobile station an "Alert with Information" message, to which the mobile station responds by sending an ACK message back to the BMI. Thereafter, the mobile station can enter a "Waiting for Answer" task and alert the user. The mobile station alerts the user for a predefined period of time (e.g., 65 seconds), but if the user answers the call within the predefined period of time, such as by utilizing the user interface of the mobile station, the mobile station sends a "Connect" message to the system indicating that the user has answered the call. Thereafter, the BMI can complete the call setup by transmitting a "Base Station ACK" message to the mobile station. Upon receipt of the Base Station ACK message, the mobile station can enter a "Conversation" task. The communication link can then be established with the calling device. More particularly, the controller 34 can operate the transmitter 30 and receiver 32 to establish a communication link with the calling device. Thereafter, the calling party can deliver services to the mobile station.

As well be appreciated by those skilled in the art, in various instances, the user of the mobile station 10 may not desire to receive the services in real-time. That is to say, in various instances, the user of the mobile station may not desire to answer the alert from the mobile station. However, the user may nonetheless desire to have services, such as voice messages, delivered to the mobile station. As indicated above in the background section, by requiring the mobile station to proceed through the entire ringing cycle, the mobile station may unnecessarily tie up a voice or traffic channel. And because traffic channels are an important and valuable resource in a cellular communications system, it is an important goal to make the most efficient use of the traffic channels to thereby maintain system capacity at a high level.

According to embodiments of the present invention, the mobile station is capable of being configured to reduce the period of time the mobile station occupies a traffic channel in instances in which a user of the mobile station desires to receive services, such as voice messages, voice clips, video clips, multimedia clips or the like. In this regard, the mobile station is capable of being configured to receive services without a user of the mobile station answering a call to the mobile station. Further, the mobile station may be configured to receive services without the user first being notified of the call to the mobile station. As used herein, according to embodiments of the present invention, the mobile station is capable of receiving the services without the call first being answered by any entity capable of answering a call while the mobile station is in a Waiting for Answer task. For example, the mobile station is capable of receiving the services without the call first being answered by entities such as the user of the mobile station, the mobile station itself, any entity to which the mobile station may forward the call, or the like.

More particularly, according to embodiments of the present invention, the mobile station 10 is capable of being configured to enter a conversation or information transfer state autonomously, such as by entering a Conversation task, without the user of the mobile station answering a call to the mobile station. Further, the mobile station may be capable of being configured to enter the conversation or information transfer state without first entering a Waiting for Answer task and notifying the user of the mobile station of the call. The mobile station can be configured in any of a number of different manners, such as by presenting on the display 42 an option to receive services, such as voice messages, voice clips, video clips, multimedia clips or the like, without answering a call for such services, and without prior notification if so desired. Upon selection of the option, then, the mobile station can be configured such that upon receipt of an alert of an incoming call, such as an Alert with Information message from the BMI 22, the mobile station can autonomously thereafter enter the conversation or information transfer state, such as by transmitting a Connect message to the BMI. Then, for example, upon receipt of a Base Station ACK message, the mobile station can enter the Conversation task without user intervention.

A method of delivering services according to embodiments of the present invention will now be described in conjunction with two typical scenarios of delivering services to a receiving entity, such as a mobile terminal (e.g., mobile station 10), a fixed terminal or the like. It should be understood, however, that the scenarios described are but two of a number of different scenarios of delivering services to the receiving entity according to embodiments of the present invention. In the first scenario, a voice clip is delivered to a receiving entity comprising a mobile station. As described below regarding this scenario, the service comprises a voice clip, although it should be understood that the service delivered according to this scenario can comprise any of a number of different services, including voice messages, voice clips, video clips, multimedia clips or the like. The voice clip can be delivered from any of a number of different entities capable of transmitting voice clips to the mobile station. For example, the voice clip can be delivered to the mobile station from a calling entity comprising the message center 24. The voice clip can comprise any of a number of different types of voice clips, including previously recorded voice messages received by the message center, and intended for subsequent delivery to the mobile station.

In the second scenario, a calling entity comprising a calling party desires to communicate with the user of a receiving entity comprising a mobile station 10, but in the absence of communicating with the user, desires to leave a voice message for the user. In this scenario, the calling party can utilize any of a number of calling terminals, such as another mobile station, a fixed terminal or the like. Also in this scenario, if the user desires to be alerted of an incoming call, the mobile station can be further configured to alert the user of the incoming call for a predetermined period of time (typically shorter than that according to traditional call processing techniques), but irrespective of whether the user answers the call, autonomously enter the conversation or information transfer state. In this regard, if the user answers the incoming call, the mobile station may be configured to process the call in a conventional manner. If the user does not answer the call, however, the mobile station may be configured to enter the conversation or information transfer state to thereby permit the calling party to leave a voice message, such as by activating a local voice message application. If, on the other hand, the user does not desire to be alerted of the incoming call, the mobile station may be configured to process the call as though the user of the mobile station did not answer the call after being alerted for any period of time. For example, the controller 34 of the mobile station can be further configured to activate the local voice message application, and thereafter receive and locally store a voice message.

In either scenario, referring now to FIG. 3, a call with the mobile station 10 can be initiated by a network entity, such as a calling entity (e.g., the message center 24, a calling party, etc.), the BMI 22 or any portions thereof. In this regard, the call can be initiate by the network entity attempting to communicate with the mobile station. The network entity can attempt to communicate with the mobile station, either directly or indirectly, in any of a number of different manners. For example, the calling entity can notify the BMI 22, or more particularly the MSC 16, of a desire to initiate a call with the mobile station, such as according to any of a number of known techniques. After notifying the BMI of a desire to initiate a call, the BMI can then send a page message to the mobile station on a control channel (with a distinctive alert message). Next, the mobile station can reply with a page response back to the BMI. The BMI can then send the mobile station a traffic channel (TCH) allocation, to which the mobile station may optionally respond with a TCH allocation acknowledgement (ACK) message. Thereafter, the mobile station can re-tune to the allocated traffic channel and start TCH transmission by entering a Waiting for Order task.

After attempting to communicate with the mobile station 10, the network entity can send the mobile station can alert the mobile station of the incoming call, such as according to any of a number of different manners. For example, the BMI 22 can send the mobile station an Alert with Information message. If the user of the mobile station does not desire to be alerted of the incoming call, in contrast to the technique of FIG. 2, the mobile station does not respond to the Alert with Information message by entering a Waiting for Answer task and alerting the user. However, although not shown, if the user of the mobile station desires to be alerted of the incoming call, the mobile station can respond to the Alert with Information message by entering a Waiting for Answer task and alerting the user, such as for a predetermined period of time typically no greater than the predefined period of time (e.g., 65 seconds) of the technique of FIG. 2. By entering the Waiting for Answer task and alerting the user, the user of the mobile station may answer the call, to which the mobile station may respond by processing the incoming call in a conventional manner.

In further contrast to the method of FIG. 2, according to embodiments of the present invention, irrespective of whether the user of the mobile station is alerted of the incoming call, in response to receiving the alert (e.g., Alert with Information message), the mobile station 10 can autonomously enter a conversation or information transfer state. For example, the mobile station can autonomously send a Connect message to the system, or more particularly to the MSC 16. Although not shown, before sending the Connect message to the system, the mobile station can send an ACK message back to the MSC, and thereafter send the Connect message. In either event, after sending the Connect message, the BMI 22, or more particularly the base station 14, can transmit a Base Station ACK message to the mobile station. And upon receipt of the Base Station ACK message, the mobile station can enter a "Conversation" task.

Irrespective of how the mobile station 10 enters the conversation or information transfer state, after entering the conversation or information transfer state, the services can be delivered to the mobile station without user intervention and without alerting the user. In the scenario of receiving the voice clip from the message center 24, for example, the communication link can be established with the message center, and the voice clip can be delivered to the mobile station 10. For example, the controller 34 can operate the transmitter 30 and receiver 32 to establish a communication link with the network entity, either directly or indirectly. Thereafter, the services can be delivered to the mobile station, such as by the network entity. In the scenario of receiving a call from a calling party, the mobile station can activate a voice message application as the communication link is established. The calling party can then record a voice message. In either event, the voice clip or voice message can be stored by the mobile station, such as in non-volatile memory 52, and thereafter played by the user of the mobile station.

As will be appreciated by those skilled in the art, in both scenarios, operation of the system according to embodiments of the present invention allow the cellular network to maintain a higher degree of capacity by requiring less traffic channels to deliver the services, and/or by requiring the traffic channels to be active for a reduced period of time. More particularly, in both scenarios, by transmitting the Connect message without first requiring the user to answer the incoming call, according to embodiments of the present invention, the traffic channel assigned to the mobile station is active for a predefined period of time less than in conventional techniques. Also, in the scenario where the message center delivers a voice clip comprising a previously recorded voice message intended for the mobile station, according to embodiments of the present invention, less traffic channels are required than in conventional techniques of attempting to communicate with a user of the mobile station, and thereafter storing a voice message at the message center. In this regard, a traffic channel between the entity originating the voice message and the message center is not required simultaneously with the traffic channel to deliver the voice message from the message center.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of delivering a service to a mobile station comprising:
   receiving an alert message to thereby initiate a call to the mobile station, wherein the alert message is received by the mobile station from a network entity over a traffic channel; and
   entering one of a conversation and information transfer state based upon the alert message without the initiated call first being answered, wherein entering one of the conversation and information transfer state includes:
      transmitting a message in response to the alert message without the initiated call first being answered, wherein the message is transmitted over the traffic channel from the mobile station to the network entity, and
      wherein the message is transmitted to establish a communication link with the mobile station over the traffic channel, the communication link being established to deliver the service to the mobile station over the communication link.

2. A method according to claim 1, wherein transmitting a message comprises
   transmitting a connect message, and
   wherein entering one of the conversation and information transfer state further includes establishing the communication link with the mobile station over the traffic channel.

3. A method according to claim 1, wherein transmitting a message comprises transmitting a message without first waiting for an answer to the call.

4. A method according to claim 1, wherein the service comprises a voice message, and wherein the method further comprises activating a voice message application to thereby receive the voice message delivered to the mobile station over the communication link.

5. A method according to claim 1 further comprising:
   delivering the service, wherein the service comprises at least one a voice message, a voice clip, a video clip and a multimedia clip.

6. A method according to claim 1 further comprising configuring the mobile station to receive the service without the initiated call first being answered, wherein the mobile station is configured before receiving the alert message.

7. A method according to claim 1, wherein receiving an alert message comprises receiving an alert message from a network entity comprising a Base Station/MSC/Interworking function (BMI).

8. A method according to claim 1 further comprising:
   alerting a user of the call after receiving the alert message such that the user can answer the incoming call, wherein entering one of a conversation and information transfer state comprises entering one of a conversation and information transfer state if the user does not answer the incoming call.

9. A method according to claim 1, wherein entering one of a conversation and information transfer state comprises entering one of a conversation and information transfer state based upon the alert message without the initiated call first being answered by a user of the mobile station.

10. A mobile station comprising:
    a receiver adapted to receive an alert message over a traffic channel from a network entity to thereby initiate a call to the mobile station, the call being initiated to thereby provide a service to the mobile station; and
    a controller configured such that the mobile station receives the service without the initiated call first being answered, wherein the controller is adapted to enter one of a conversation and information transfer state based upon the alert message without the initiated call first being answered, wherein the one of the conversation and information transfer state is entered to provide the service to the mobile station.

11. A mobile station according to claim 10 further comprising:
a transmitter adapted to be directed by the controller to transmit a connect message over the traffic channel to the network entity in response to the alert message, wherein the connect message is transmitted without the initiated call first being answered, and
wherein the controller is adapted to operate the receiver and transmitter to thereby establish a communication link over the traffic channel, the receiver being adapted to thereafter receive the service over the communication link.

12. A mobile station according to claim 11, wherein the transmitter is adapted to transmit the connect message without the mobile station first waiting for an answer to the call.

13. A mobile station according to claim 11, wherein the service comprises a voice message, and wherein the controller is further adapted to activate a voice message application to thereby receive the voice message received by the receiver over the communication link.

14. A mobile station according to claim 10, wherein the receiver is adapted to receive a service comprising at least one a voice message, a voice clip, a video clip and a multimedia clip.

15. A mobile station according to claim 10, wherein the receiver is adapted to receive an alert message from a network entity comprising a Base Station/MSC/Interworking function (BMI).

16. A mobile station according to claim 10, wherein the controller is adapted to alert a user of the call after the receiver receives the alert message such that the user can answer the incoming call, and wherein the controller is adapted to enter one of a conversation and information transfer state if the user does not answer the incoming call.

17. A mobile station according to claim 10, wherein the controller is adapted to enter one of a conversation and information transfer state based upon the alert message without the initiated call first being answered by a user of the mobile station.

18. A system for delivering a service to a mobile station comprising:
a network entity adapted to initiate a call by transmitting an alert message over a traffic channel, the call being initiated to thereby provide a service; and
a mobile station adapted to receive the service without the call initiated by the network entity first being answered by the mobile station, wherein the mobile station is adapted to receive the alert message, and thereafter entering one of a conversation and information transfer state based upon the alert message without the initiated call first being answered, and wherein the one of the conversation and information transfer state is entered to thereby deliver the service to the mobile station.

19. A system according to claim 18, wherein the mobile station is adapted to enter one of the conversation and information transfer state by:
receiving the alert message, and thereafter transmitting a connect message in response to the alert message without the call initiated by the network entity first being answered, wherein the mobile station is adapted to transmit the connect message over the traffic channel,
wherein the network entity is adapted to establish a communication link with the mobile station at least partially over the traffic channel to thereby deliver the service to the mobile station over the communication link.

20. A system according to claim 19, wherein the mobile station is adapted to transmit the connect message without first waiting for an answer to the call.

21. A system according to claim 19, wherein the service comprises a voice message, and wherein the mobile station is further adapted to activate a voice message application to thereby receive the voice message delivered to the mobile station over the communication link.

22. A system according to claim 18, wherein the mobile station is adapted to enter one of the conversation and information transfer state to thereby deliver the service comprising at least one a voice message, a voice clip, a video clip and a multimedia clip to the mobile station.

23. A system according to claim 18, wherein the network entity comprises a Base Station/MSC/Interworking function (BMI).

24. A system according to claim 18, wherein the mobile station is adapted to alert a user of the call after the receiver receives the alert message such that the user can answer the incoming call, and wherein the mobile station is adapted to enter one of a conversation and information transfer state if the user does not answer the incoming call.

25. A system according to claim 18, wherein the mobile station is adapted to receive the alert message, and thereafter enter one of a conversation and information transfer state based upon the alert message without the initiated call first being answered by a user of the mobile station.

26. A wireless communication system for delivering a service to a receiving entity comprising:
a network entity adapted to initiate a call by transmitting an alert message over a traffic channel, the call being initiated to thereby provide a service; and
a wireless receiving entity adapted to receive the service without the call initiated by the network entity first being answered by the wireless receiving entity, and wherein the wireless receiving entity is adapted to receive the alert message, and thereafter enter one of a conversation and information transfer state without the initiated call first being answered to thereby deliver the service to the wireless receiving entity, and
wherein one of the conversation and information transfer state is entered to establish a communication link with the wireless receiving entity over the traffic channel.

* * * * *